E. L. CONDON.
PUMP.
APPLICATION FILED JAN. 7, 1920.
1,385,307.
Patented July 19, 1921.
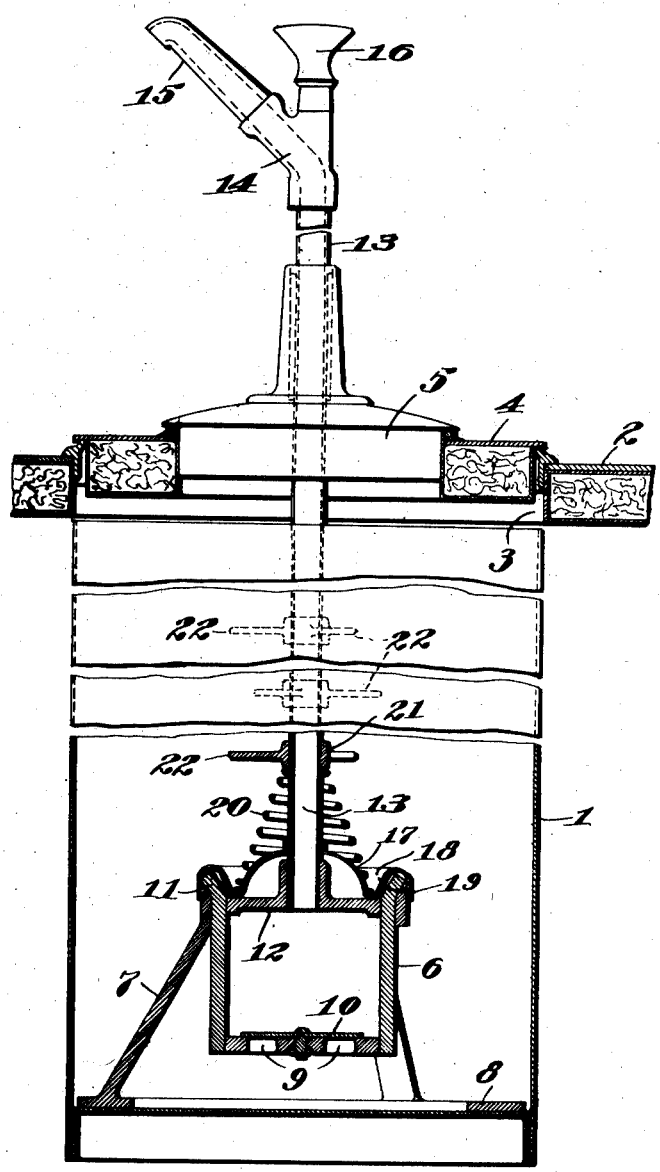

UNITED STATES PATENT OFFICE.

ERNEST L. CONDON, OF MEDWAY, MASSACHUSETTS, ASSIGNOR TO UNITED SODA FOUNTAIN COMPANY, OF BOSTON, MASSACHUSETTS, A CORPORATION OF MASSACHUSETTS.

PUMP.

1,385,307.  Specification of Letters Patent.  Patented July 19, 1921.

Application filed January 7, 1920. Serial No. 349,897.

*To all whom it may concern:*

Be it known that I, ERNEST L. CONDON, a citizen of the United States, and resident of Medway, in the county of Norfolk and State of Massachusetts, have invented new and useful Improvements in Pumps, of which the following is a specification.

This invention relates to pumps, and particularly to milk pumps of the kind used at soda fountains for dispensing milk in measured quantities.

The accompanying drawing which illustrates the invention, is a longitudinal section, partly in elevation and partly broken away, showing a preferred form of the pump and container.

1 represents the container or vessel for holding the milk or other fluid. The container, which may be of any desired form, is preferably in the form of a tall cylindrical can, which is placed in an ice chest under an opening 3 in the top 2 of the chest. The opening 3 is provided with a cover 4 having a fitting 5 which carries the pump piston and spout and their associated parts.

In the bottom of the container 1 is a pump cup or cylinder 6, mounted on a tripod 7, or other suitable support, so that its bottom is supported clear of the bottom of the container. The support 7 merely rests in the bottom of the container without any attachment so that it may be readily removed for cleaning. The pump cylinder may be positioned centrally of the container by the annular base 8 of the support which loosely fits the bottom of the container 1. The inlet port 9 in the bottom of the cylinder 6 is controlled by a flap valve 10 which opens to permit liquid to flow into the cylinder but closes to prevent its escape. The top of the cylinder is flared as shown at 11.

A pump piston 12 working in cylinder 6 is fixed to the end of a tubular stem 13, which extends up through the container 1 and top fitting 5. At its upper end the tube is connected to a bend 14 which terminates in a delivery nozzle 15. 16 is a handle by which the tubular stem and piston are pressed downwardly.

Loosely mounted on the lower end of the stem 13 just above the piston 12, is a shell 17 of thin metal bent or spun to form a dome-like central body, an annular channel 18 on its upper side, and an annular channel 19 on its under side. The lower end of a tapered coil wire compression spring 20 bears in the channel 18, and the upper end of the spring abuts against a collar 21 fast on the stem 13.

The channel 19 on the bottom of shell 17 fits over the edge of the pump cylinder 6.

When the piston 12 is pressed downwardly by the handle 16, the liquid contents of the cylinder 6 will be forced upwardly through the tubular stem 13 and out through the delivery nozzle 15, each stroke of the pump thus delivering a measured quantity of liquid. By the same motion of the piston the spring 20 will be compressed between the collar 21 and the shell 17 which slides on stem 13. When the handle 16 is released, the spring 20 being now free to expand will force the piston again to its uppermost position thereby drawing in liquid from the container 1, through valve 10 into the cylinder, and the device is ready for the next operation.

As the device is particularly designed for a milk pump, and it is desirable that the milk be frequently stirred to prevent the cream from rising to the top, a number of stirring projections 22 are fixed to the stem 13 at intervals by collars or other suitable means.

By removing the cover 4, 5, the entire pump may be readily taken out of the container for cleaning. Or, by removing the fitting or cap 5 alone from the annular cover member 4, the piston and stem and parts carried thereby may be removed together leaving the cylinder 6 in place, as the top of the cylinder is open and the piston is readily removable therethrough.

Similarly, in reassembling the parts, the pump cylinder 6 and support 7 are first placed in the bottom of the container, the cover member 4 may then be placed in position, and finally the piston and its associated parts are inserted, and the cap 5 is set in position in the cover 4.

The flaring end 11 of the cylinder and the channel 19 of the shell 17 tend mutually to guide the piston and cylinder into proper relation to each other as the parts are brought together. And the spring 20, being carried by the piston and stem, does not have to be compressed or manipulated in order to insert the piston into the cylinder as would be necessary if the spring were held between the upper part of the stem and an abutment on the cover. Thus a simple and effective structure is provided and the assembling of the device is greatly facilitated.

I claim:

1. A pump comprising a container, an annular cover therefor, a cap for the opening in said cover, a removable pump cylinder in the container, a piston in said cylinder removable through the top of the cylinder without removing the cylinder from the container, a top for said cylinder normally closing the same but freely removable with the piston therefrom, and a stem fast to the piston extending upward through said cap.

2. A pump comprising a container, an annular cover therefor, means for closing the opening in said cover, a removable pump cylinder in the container, a removable top for said cylinder, and resilient means normally operative to retain said top in engagement with the upper end of the cylinder, said piston and said top being removable from the upper end of the cylinder.

3. A pump comprising a container, a pump cylinder in the container, a piston in said cylinder, a stem fast to the piston and extending through the top of the container having a delivery passage therethrough communicating with the interior of the cylinder, a freely removable top for said cylinder, and a compression spring having one end bearing against the top of the cylinder and the other end against an abutment fixed to the stem outside of the cylinder.

4. A pump comprising a container, a tripod loosely seated therein, a pump cylinder depending within said tripod and supported thereby whereby to maintain its lower end clear of the bottom of the container, and a piston reciprocable within the cylinder.

5. A device of the class described, comprising a pump cylinder having its upper end flared outwardly, a top member for said cylinder provided with a positioning element engageable with the flanged end of the cylinder, a piston reciprocable within the cylinder, a piston rod slidable through an aperture in said top member, and a compression spring interposed between said top member and an abutment on said rod.

6. A pump comprising a container, a pump cylinder in the container, a piston in said cylinder, a stem fast to the piston and extending through the top of the container having a delivery passage therethrough communicating with the interior of the cylinder, an abutment on the stem, a cylinder engaging member mounted to slide on the stem between the abutment and the piston, and a compression spring between the abutment and the cylinder engaging member.

7. A pump comprising a container, a pump cylinder in the container, a piston in said cylinder, a stem fast to the piston and extending through the top of the container having a delivery passage therethrough communicating with the interior of the cylinder, an abutment on the stem, a shell mounted to slide on the stem between the abutment and the piston and adapted to engage the upper edge of the cylinder, and a compression spring between the abutment and the shell.

8. A pump comprising a container, a pump cylinder in the container, a piston in said cylinder, a stem fast to the piston and extending through the top of the container having a delivery passage therethrough communicating with the interior of the cylinder, an abutment on the stem, a shell mounted to slide on the stem between the abutment and the piston formed with a channel on its under side adapted to engage the upper edge of the cylinder and a channel on its upper side within the first named channel, and a coil compression spring bearing at one end against the abutment and at the other end against the channel in the upper side of the shell.

9. A pump comprising a container, a pump cylinder in the container, a removable support for the pump cylinder loosely engaging the container walls and adapted to support the cylinder clear of the bottom of the container and to position the cylinder laterally in the container.

10. A pump comprising a container, a pump cylinder in the container, a removable support for the pump cylinder having supporting legs rising from an annular base loosely fitting the bottom of the container, adapted to support the cylinder clear of the bottom of the container and to position the cylinder laterally in the container.

Signed by me at Boston, Massachusetts, this 30 day of December, 1919.

ERNEST L. CONDON.